(12) United States Patent
Wheelwright et al.

(10) Patent No.: US 10,861,240 B1
(45) Date of Patent: Dec. 8, 2020

(54) VIRTUAL PUPIL CAMERA IN HEAD MOUNTED DISPLAY

(71) Applicant: Facebook Technologies, LLC, Menlo Park, CA (US)

(72) Inventors: Brian Wheelwright, Sammamish, WA (US); Jacques Gollier, Bellevue, WA (US); Yusufu Njoni Bamaxam Sulai, Bothell, WA (US); Fenglin Peng, Redmond, WA (US); Babak Amirsolaimani, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 176 days.

(21) Appl. No.: 16/143,411

(22) Filed: Sep. 26, 2018

(51) Int. Cl.
*G06T 19/00* (2011.01)
*G02B 5/30* (2006.01)
*H04N 5/225* (2006.01)

(52) U.S. Cl.
CPC .......... *G06T 19/006* (2013.01); *G02B 5/3025* (2013.01); *G02B 5/3083* (2013.01); *H04N 5/2253* (2013.01)

(58) Field of Classification Search
CPC .. G06T 19/006; G02B 5/3025; G02B 5/3083; H04N 5/2253; H04N 13/332
See application file for complete search history.

(56) References Cited

U.S. PATENT DOCUMENTS

| | | | | |
|---|---|---|---|---|
| 5,835,133 | A * | 11/1998 | Moreton | H04N 13/218 348/49 |
| 10,466,484 | B1 * | 11/2019 | Yoon | G02B 27/0093 |
| 2010/0202048 | A1 * | 8/2010 | Amitai | G02B 27/28 359/485.02 |
| 2014/0177023 | A1 * | 6/2014 | Gao | G02B 27/283 359/238 |
| 2017/0212352 | A1 * | 7/2017 | Cobb | G02B 1/041 |
| 2017/0295353 | A1 * | 10/2017 | Hwang | H04N 13/344 |
| 2018/0157044 | A1 * | 6/2018 | Choi | H04N 13/30 |
| 2019/0273910 | A1 * | 9/2019 | Malaika | G06F 3/013 |

FOREIGN PATENT DOCUMENTS

WO  WO-2018140005 A1 *  8/2018  ........... H04N 13/271

* cited by examiner

*Primary Examiner* — Fernando Alcon
(74) *Attorney, Agent, or Firm* — Freestone Intellectual Property Law PLLC (57) ABSTRACT

A head mounted display (HMD) includes a display, at least one reflective layer, and a camera. The camera captures scene images from reflections of scene light off the at least one reflective layer. The camera is positioned in a virtual pupil position of the eyebox area with respect to the incoming scene light.

12 Claims, 9 Drawing Sheets

VIRTUAL PUPIL CAMERA IN HEAD MOUNTED DISPLAY

TECHNICAL FIELD

This disclosure relates generally to optics and in particular to head mounted displays.

BACKGROUND INFORMATION

In Virtual Reality (VR), Mixed Reality (MR), and Augment Reality (AR), there may be contexts when a wearer of a head mounted display (HMD) should be aware of their physical surroundings. In AR and MR, a wearer of a HMD may be able to view scene light of an external physical environment while also viewing virtual images presented on a display of the HMD. In VR, scene light from the external environment is often purposely blocked out from the view of a wearer of an HMD to increase "presence." Still, a variety of techniques have been developed to assist a wearer of an HMD to be more aware of their surroundings. However, many of these techniques are quite flawed.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a virtual pupil position for an HMD camera are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The disclosure includes a HMD having a camera positioned in a virtual pupil position of an eyebox area for a wearer of the HMD that improves the spatial awareness of a user of the HMD. Since the camera is positioned to image the external environment of the HMD from a virtual pupil position that is approximately the same as the eye of a wearer of the HMD, images from the camera (or portions of those images) that are presented to user with the display of the HMD are from the correct perspective.

Conventionally, HMDs may have one or more "tracking" cameras that are mounted on the outside of the HMD to image the external environment. Those images may be used to provide the user cues (e.g. presented on the display of the HMD) as to whether they will encounter a physical object as they move through physical space. For objects in the far-field, the perspective of an external camera may be quite similar to the perspective of the eye of the user. When an object is in the far-field, the "angle-space" for the camera and the eye may be almost the same. However, for physical objects in the near-field (e.g. closer than 3 meters), an offset in the perspective of an external camera from the eye of the user may cause substantial errors in the spatial awareness of the user in a physical environment because the angle-space is substantially different.

In embodiments of the disclosure, the camera is positioned to have the same or very similar perspective as the eye of the user if the user was viewing the same scene as the camera. In contexts such as "pass-through" virtual reality, images or portions of images captured by the camera may be presented to the user on the display of an HMD. When a user interacts with objects in the physical world, having the outward facing camera capture images from a pupil position that is similar to the eye of the user allows the user to interact with objects in the physical world by viewing the images of those objects on the display of the HMD. In an embodiment, a camera is mounted facing outward on the front an HMD and a lens assembly in the front of the camera provides a folded optical path so that the camera has a virtual pupil position of an eye of a user of the HMD. In an embodiment, the camera is positioned a distance from a mirror (within the headset) that is approximately the same distance as the eye so that the virtual position of the camera simulates the position (and perspective) of an eye of a wearer of the HMD. In an embodiment, a mirror is placed on the front of a headset and the camera is positioned in front of the mirror pointing back at the mirror where the camera is offset from the mirror by the same distance that the eye is offset from the display. These and other embodiments are described in detail below in connection with FIGS. 1-6.

Figure 1:
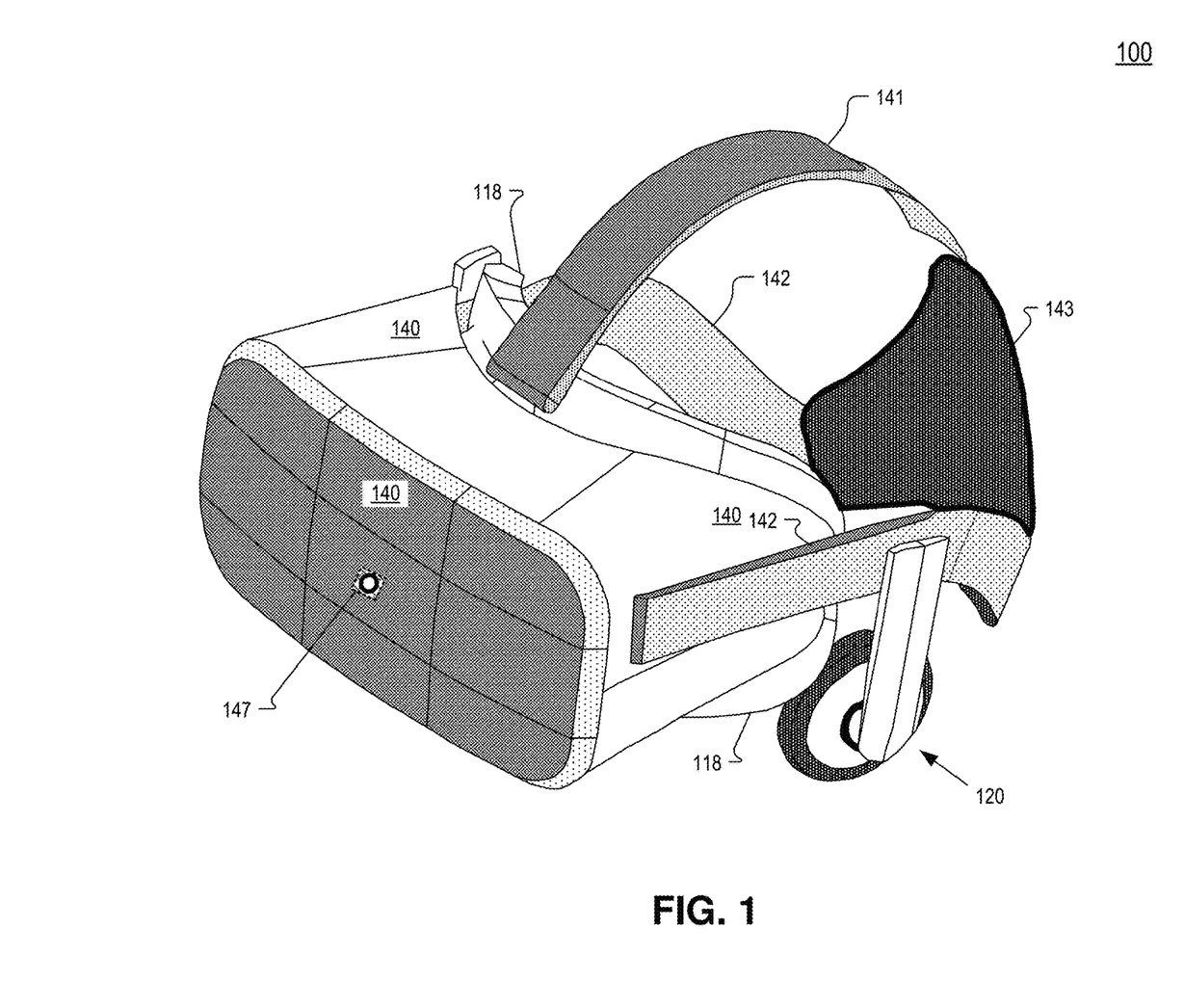
FIG. 1 illustrates an example head mounted display (HMD) that includes a camera to image an external environment of the HMD.

FIG. 1 illustrates an example head mounted display (HMD) 100 that includes a camera to image an external environment of HMD 100. In FIG. 1, camera 147 is illustrated in a conventional position for imaging the external environment of HMD 100. The illustrated example HMD 100 includes a top structure 141, a rear securing structure 143, and a side structure 142 attached with a viewing structure 140. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics)

for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display for directing display light to a wearer of HMD 100. The display may include an LCD, an organic light emitting diode (OLED) display, micro-LED display, quantum dot display, pico-projector, or liquid crystal on silicon (LCOS) display for directing image light to a wearer of HMD 100.

Figure 2:
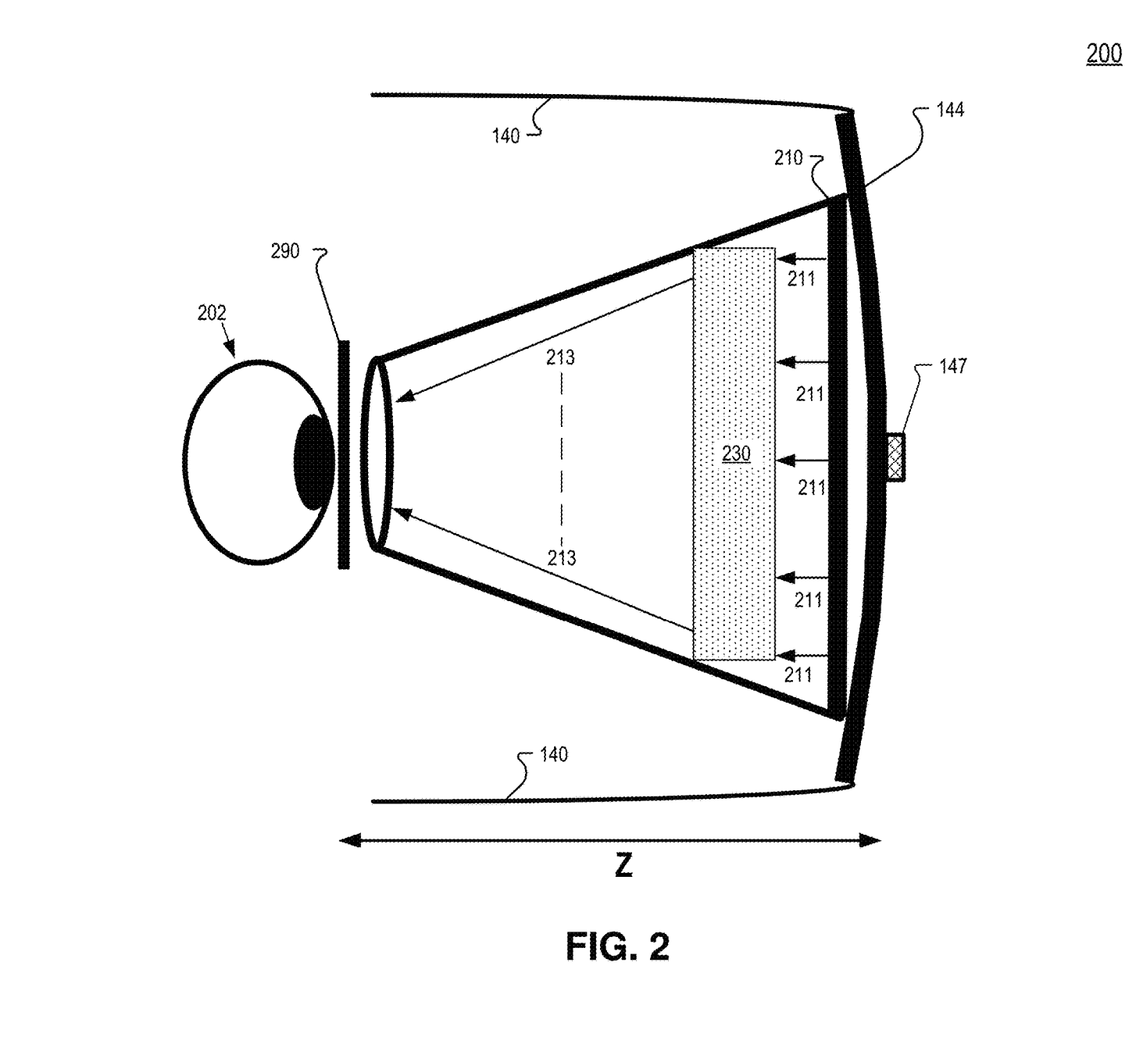
FIG. 2 illustrates a cut away view of an HMD that includes a display and an optical assembly configured to direct display light to an eyebox area.

FIG. 2 illustrates a cut away view of an HMD 200 that includes a display 210 and an optical assembly 230 configured to direct display light 211 to an eyebox area 290. In FIG. 2, camera 147 is offset from an eyebox area by an offset distance having a depth "z". Optical assembly 230 is positioned to receive the display light 211 and direct the display light 211 to eye 202 as image light 213. Optical assembly 230 may be configured to allow eye 202 of a wearer of HMD 200 to focus on a virtual image displayed by display 210. Although FIG. 2 only illustrates one eye 202, an HMD may have a display 210 (or a portion of a shared display) and an optical assembly 230 for each eye of the user of the HMD.

In FIG. 2, camera 147 is offset from eyebox area 290 by an offset distance having a depth "z". In the context of pass-through VR, images from camera 147 may be presented to the user of the HMD on display 210 to give the user a sense of their physical environment without the need to remove the HMD from their head. However, if a user attempted to grasp an object that was 1 meter away (based on the camera images rendered to display 210), the reach of the user may be off by the distance "z" because the perspective of camera 147 is offset by depth distance "z" from the eyebox area 290.

Figure 3A:
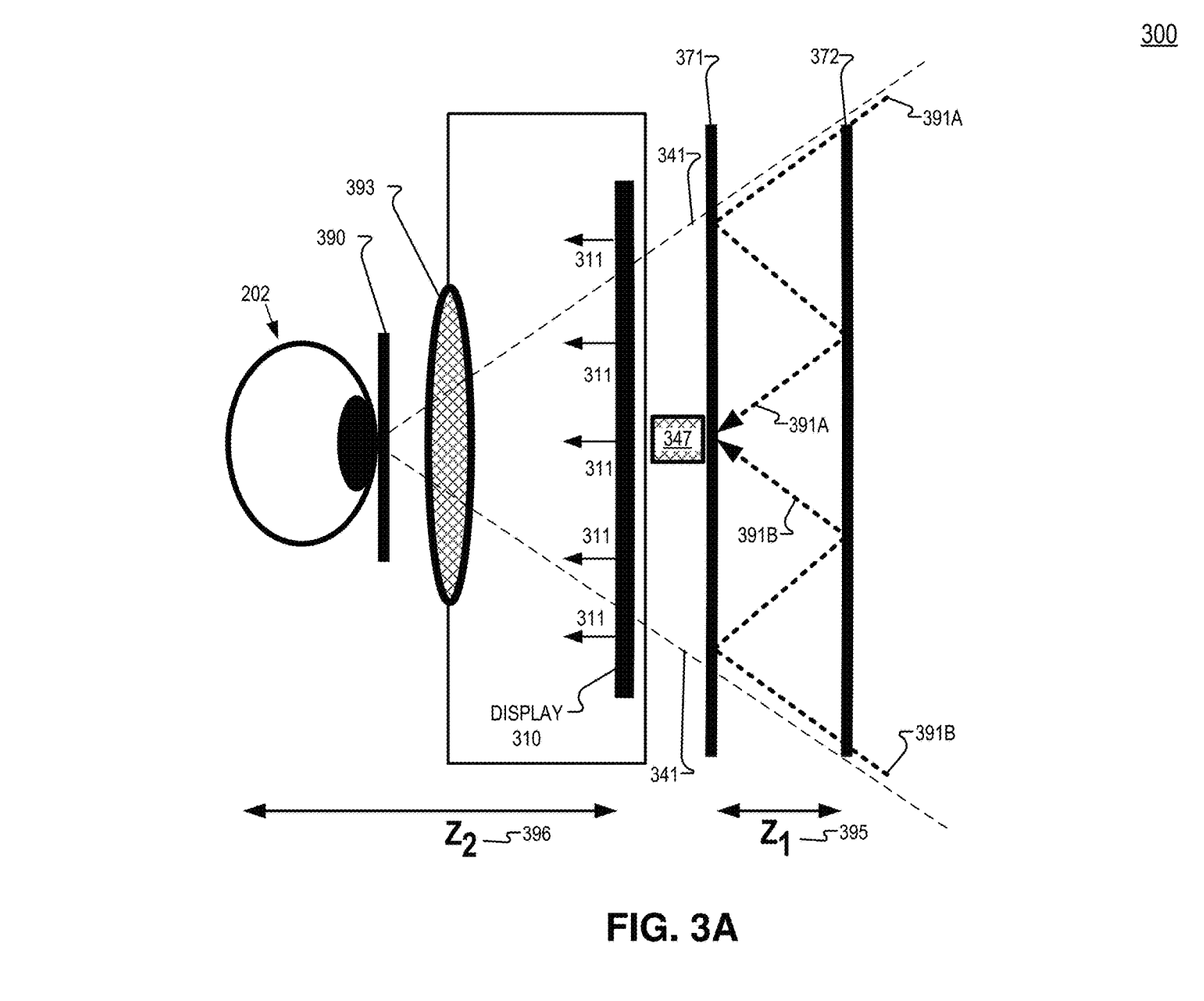
FIGS. 3A-3D illustrates an example view of an HMD system that includes a folded optical path and a camera positioned in a virtual pupil position of the eyebox area, in accordance with embodiments of the disclosure.

FIG. 3A illustrates an example top view of an HMD system 300 that includes a folded optical path and a camera positioned in a virtual pupil position of the eyebox area 390, in accordance with embodiments of the disclosure. System 300 includes a display 310, a lens element 393, camera 347, a first optical layer 371, and a second optical layer 372. Lens element 393 is configured to focus display light 311 to eyebox area 390 for an eye 202 of a user of an HMD. First optical layer 371 is at least partially reflective and second optical layer 372 is also at least partially reflective. In one embodiment, first optical layer 371 includes a reflective polarizer that reflects a first polarization orientation of incident light (e.g. vertically oriented linearly polarized light) and transmits (passes) a second polarization orientation of incident light that is orthogonal to the first polarization orientation (e.g. horizontally oriented linearly polarized light). In one embodiment, second optical layer 372 includes a partially mirrored surfaces that passes a portion of incident light (e.g. passes approximately fifty percent of incident light) and reflects the remaining portion of incident light. First optical layer 371 is disposed between display 310 and second optical layer 372.

Camera 347 is oriented to capture scene images of incoming scene light propagating along a folded optical path 391 that includes reflecting off the first optical layer 371 and reflecting off the second optical layer 372. Without an obstruction from an HMD and/or display, eye 202 may have a view 341 of the external world. Camera 347 is configured to capture images of at least a portion of that view 341 via scene light propagating along example folded optical path 391. In the illustrated embodiment, the first optical layer 371 is spaced a first distance $Z_1$ 395 from second optical layer 372 and eyebox area 390 is spaced a second distance $Z_2$ 396 from display 310. The second distance $Z_2$ 396 may be approximately three times more than the first distance $Z_1$ 395 so that the optical path length for a given photon of incident scene light propagating along optical path 391 would be a same length as the photon encountering eyebox area 390. Therefore, camera 347 is disposed in a virtual pupil position of eyebox 390 with respect to the incoming scene light. It is understood that FIG. 3A is illustrated to show the function of system 300 and may not be drawn to scale. Camera 347 may be significantly smaller and optical layer 371 may be disposed much closer to display 310, in a manufactured HMD that incorporates system 300.

Figure 3B:
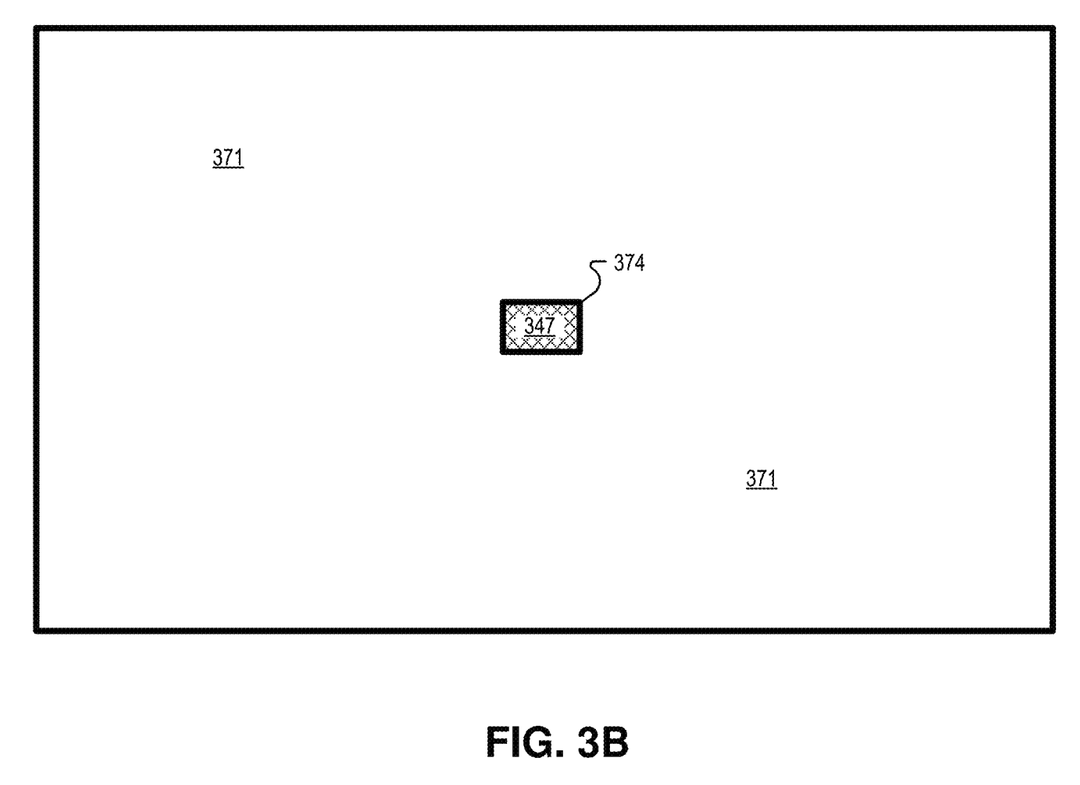

FIG. 3B illustrates a plan view of an example optical layer 371 that includes an aperture void 374 for the camera 347 to receive scene light to capture images of an external environment of the HMD, in accordance with embodiments of the disclosure. Aperture void 374 may be in a middle of optical layer 371. The middle of aperture void 374 may be aligned with a center of display 310. Camera 347 may be aligned with an axis running through the middle of the display 310 where the axis is orthogonal to a pixel plane (defined by two-dimensional pixel rows and columns) of the display 310.

Figure 3C:
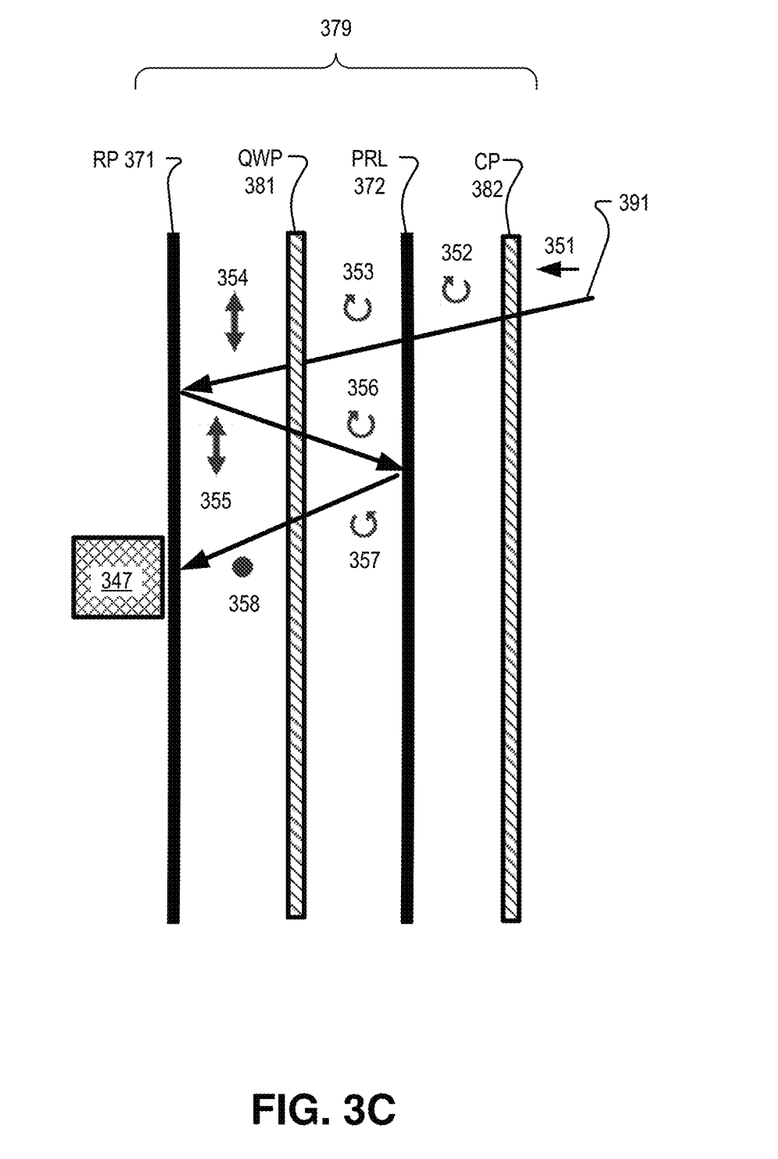

FIG. 3C illustrates an example optical assembly 379 that includes optical layers 371 and 372, in accordance with embodiments of the disclosure. Optical assembly 379 may be positioned in front of camera 347, in some embodiments. In FIG. 3C, optical layer 371 is illustrated as a reflective polarizer that reflects a first polarization orientation of incident light (e.g. vertically oriented linearly polarized light) and transmits (passes) a second polarization orientation of incident light that is orthogonal to the first polarization orientation (e.g. horizontally oriented linearly polarized light). Also in FIG. 3C, optical layer 372 is illustrated as a partially reflective layer that passes a portion of incident light (e.g. passes approximately fifty percent of incident light) and reflects the remaining portion of incident light. Example optical assembly 379 also includes a quarter-waveplate 381 disposed between the first optical layer 371 and the second optical layer 372. Optical assembly 379 also includes a circular polarizer 382, and the second optical layer 372 is disposed between the quarter-waveplate 381 and the circular polarizer 382. Optical elements 372, 381, and 382 may be sized the same as reflective polarizer 371. Quarter-waveplate 381 may be coupled to partially reflective layer 372 or reflective polarizer 371. Circular polarizer 382 may be coupled to partially reflective layer 372.

In operation, scene light 351 propagating along optical path 391 encounters circular polarizer 382. Scene light 351 may be scattered and unpolarized. Circular polarizer 382 passes circularly polarized light 352. In the illustrated embodiment, light 352 is illustrated as right-hand circularly polarized light 352. Light 352 encounters partially reflective layer 372 and a portion of the light 352 is reflected by partially reflective layer 372 (not illustrated), while the remaining portion passes through layer 372 as right-hand circularly polarized light 353. Quarter-waveplate 381 is configured to convert circular polarization to linear polarized light 354. In the illustrated embodiment, linearly polarized light 354 is illustrated as vertically oriented linearly polarized light 354. Light 354 reflects off of reflective polarizer 371 as vertically oriented linearly polarized light 355 since reflective polarizer 371 is configured to reflect vertically oriented linearly polarized light and pass horizontally oriented linearly polarized light, in FIG. 3C. Light 355 encounters quarter-waveplate 381 and is converted to right-hand circularly polarized light 356. Light 356 encounters partially reflective layer 372 and a portion of light 356 is reflected as left-hand circularly polarized light 357. Light 357 encounters quarter-waveplate 381 and is converted to horizontally oriented linearly polarized light 358. In embodiments where optical layer 371 includes a hole such as aperture void 374, light 358 will not encounter reflective polarizer 371 before becoming incident on an image sensor (e.g. a CMOS image sensor) of camera 347. In other embodiments, light 358 may encounter reflective polarizer 371 and be passed by reflective polarizer 371 to camera 347 because reflective polarizer 371 is configured to pass horizontally oriented linearly polarized light, in the illustrated embodiment.

Figure 3D:
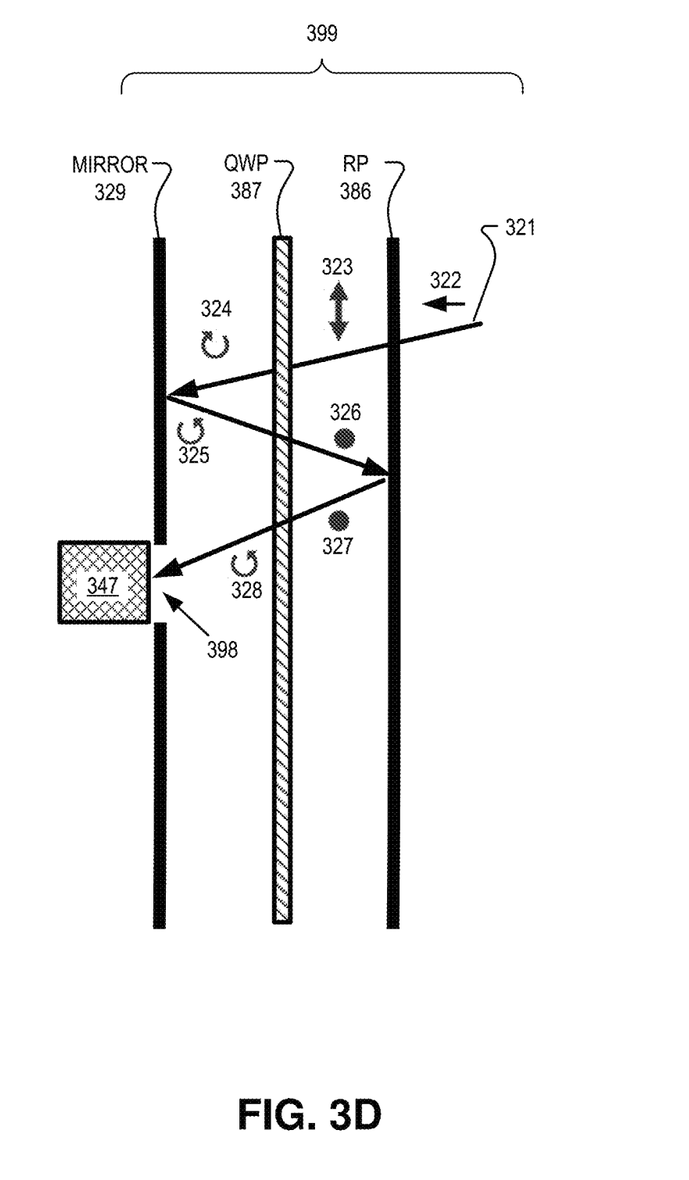

FIG. 3D illustrates an example optical assembly 399 that may be utilized instead of optical assembly 379 of FIG. 3C, in accordance with embodiments of the disclosure. FIG. 3D includes reflective polarizer 386 as the first optical layer while the second optical layer is a mirror 329, in FIG. 3D. Mirror 329 has a void that functions as an aperture void 398 for camera 347 so that light that would otherwise be reflected by mirror 329 becomes incident on camera 347. Example optical assembly 379 also includes quarter-waveplate 387 disposed between the first optical layer (reflective polarizer 386) and the second optical layer (mirror 329 in FIG. 3D). Quarter-waveplate 387 may be coupled to mirror 329 or reflective polarizer 386.

In operation, scene light 322 propagating along optical path 321 encounters reflective polarizer 386. Scene light 322 may be scattered and unpolarized. Reflective polarizer 386 is configured to pass a first linear polarization of light (e.g. vertically oriented linearly polarized light) and reflect a second linear polarization of light (e.g. horizontally oriented linearly polarized light) that is orthogonal to the first linear polarization of light. In the illustrated embodiment of FIG. 3D, reflective polarizer 386 is configured to pass vertically oriented linearly polarized light of scene light 322 as vertically polarized light 323. Light 323 encounters quarter-waveplate 387 and is converted to right-hand circularly polarized light 324, in the illustrated embodiment of FIG. 3D. Light 324 reflects off of mirror 329 as left-hand circularly polarized light 325 and is converted to horizontally polarized light 326 by quarter-waveplate 387. Light 326 is reflected by reflective polarizer 386 as horizontally polarized light 326 since reflective polarizer is configured to reflect horizontally polarized light, in the illustrated embodiment. Quarter-waveplate 387 converts light 327 into left-hand circularly polarized light 328 which propagates through aperture void 398 to become incident on camera 347.

Figure 4:
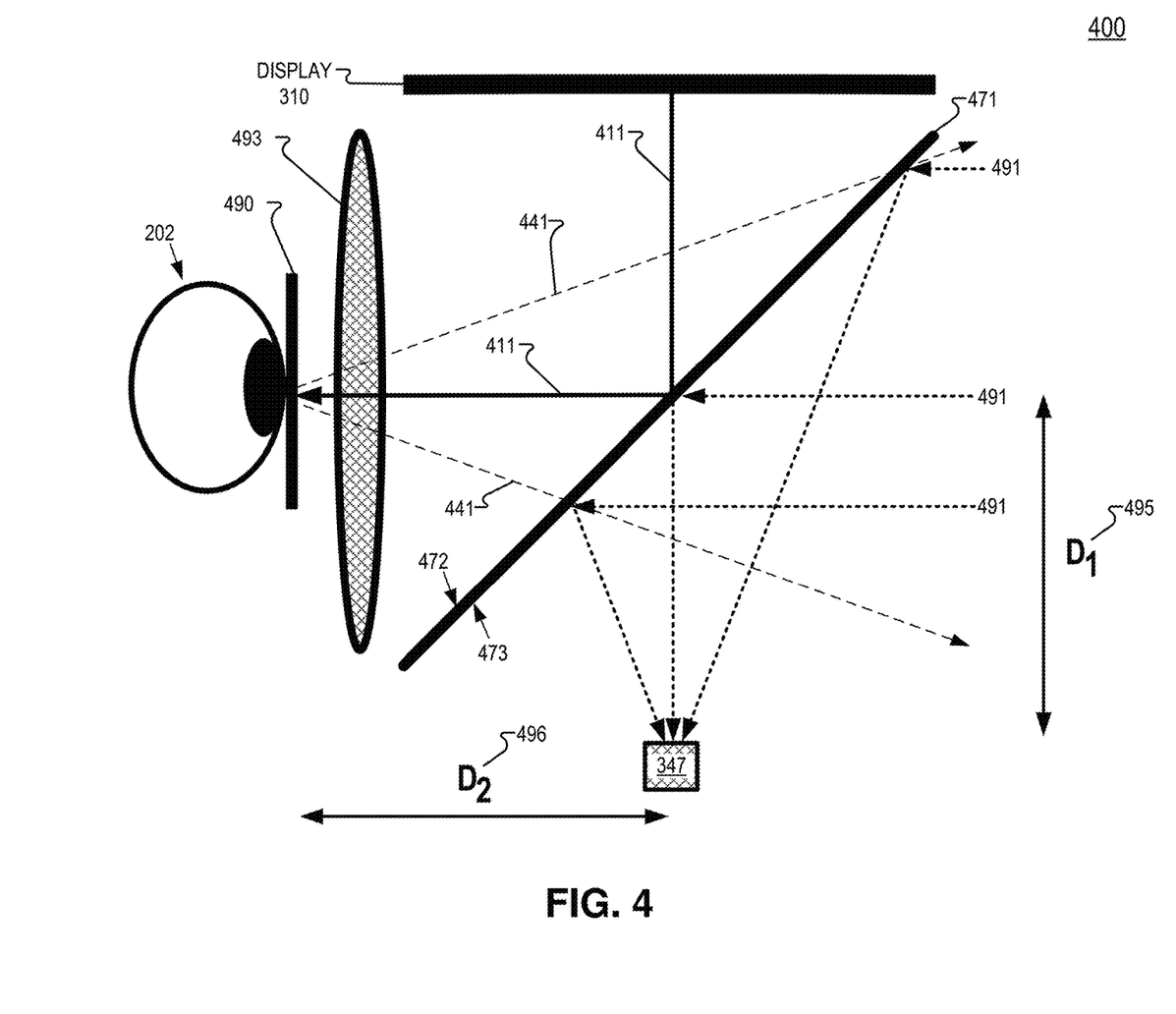
FIG. 4 illustrates an example top or side view of an HMD system that includes two reflective surfaces and a camera positioned in a virtual pupil position of the eyebox area, in accordance with embodiments of the disclosure.

FIG. 4 illustrates an example top or side view of an HMD system 400 that includes two reflective surfaces and camera positioned in a virtual pupil position of the eyebox area 490, in accordance with embodiments of the disclosure. System 400 includes a display 310, a lens element 493, camera 347, and reflective layer 471. Reflective layer 471 may be angled approximately 45 degrees in relation to the display 310 and approximately 45 degrees in relationship to the camera 347. Lens element 493 is configured to focus display light 411 to eyebox area 490 for an eye 202 of a user of an HMD. Reflective layer 471 may be a mirrored surface made of metal. Reflective layer 471 may have a first reflective surface 472 disposed opposite a second reflective surface 473. Surface 472 and 473 may be opposite sides of a same layer of metal.

In FIG. 4, display 310 emits display light 411 and display light 411 is redirected to the eyebox area 490 by first reflective surface 472. Scene light 491 from an external environment of the HMD is received by second reflective surface 473 and redirected to camera 347 for capturing scene images. Camera 347 may be positioned a first distance 495 from a middle of the reflective layer 471 that is approximately the same as a second distance 496 between reflective layer 471 and the eyebox area 490.

Without an obstruction from reflective layer 471, eye 202 may have a view 441 of the external world. Camera 347 is configured to capture images of at least a portion of that view 441 by capturing images redirected by reflective layer 471. Since camera 347 is positioned the same distance or approximately the same distance from the middle of reflective layer 471 as eyebox area 490, camera 347 provides a virtual pupil position that is approximately the same as the position of eyebox area 490, as shown in FIG. 4.

Figure 5:
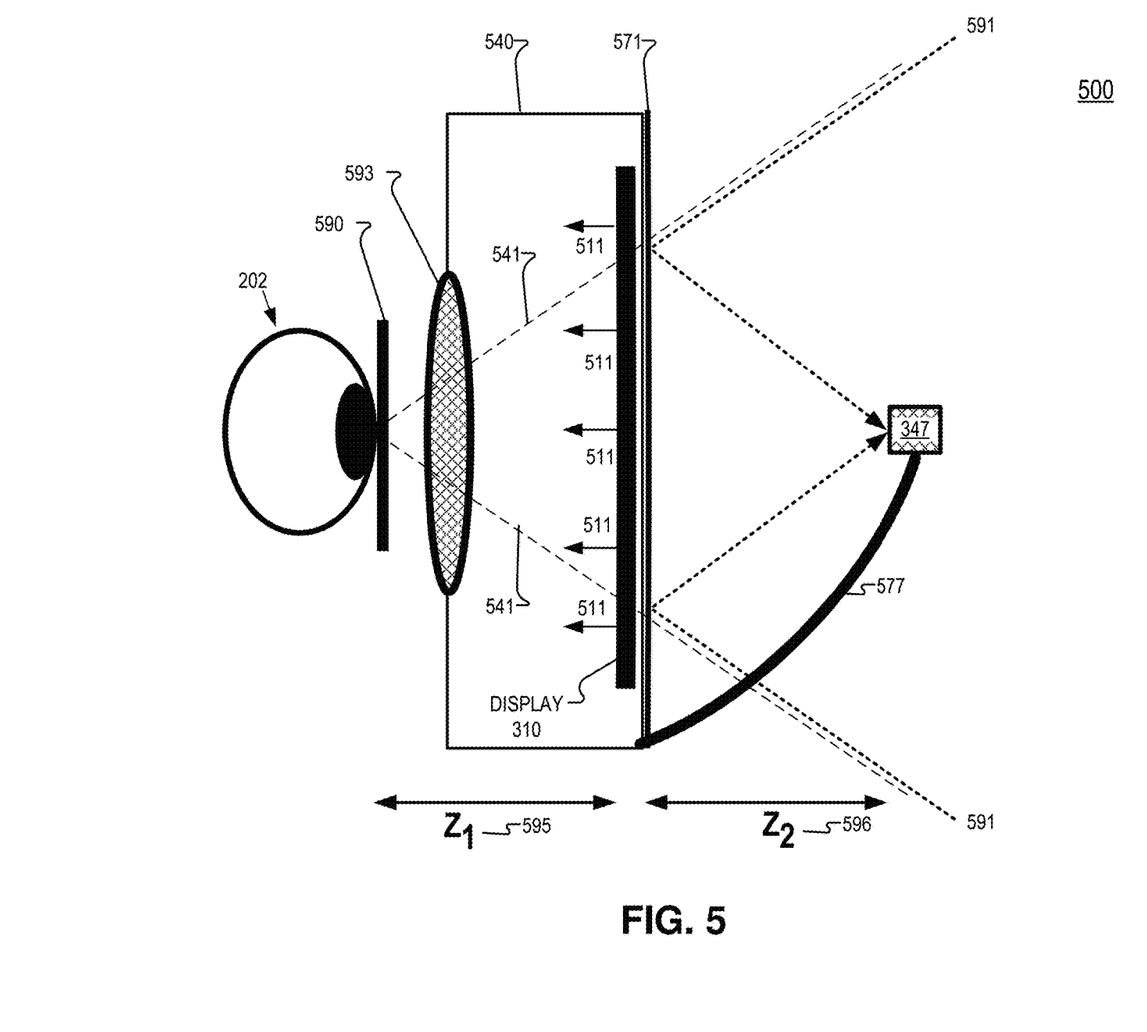
FIG. 5 illustrates an example top view of an HMD system that includes a support member and a camera positioned in a virtual pupil position of the eyebox area, in accordance with embodiments of the disclosure.

FIG. 5 illustrates an example top view of an HMD system 500 that includes a support member 577 and a camera positioned in a virtual pupil position of the eyebox area 590, in accordance with embodiments of the disclosure. System 500 includes a display 310, a lens element 593, camera 347, and a reflective layer 571. Lens element 593 is configured to focus display light 511 to eyebox area 590 for an eye 202 of a user of an HMD. Reflective layer 571 may be a mirrored surface made of metal. Display 310 is configured to provide display light 511 from a frontside of the display 310. The reflective layer 571 is disposed on a backside of display 310 that is opposite of the frontside. A pixel plane of display 310 may be parallel to a two-dimensional plane that the reflective layer 571 is disposed on.

In FIG. 5, display 310 emits display light 511 for presenting images to the eye(s) of a user of HMD system 500. Scene light 591 from an external environment of the HMD is received by reflective layer 571 and redirected to camera 347 for capturing scene images. Camera 347 is oriented to capture scene images of scene light 591 reflective from reflective layer 571. Support member 577 supports camera 347 and extends camera 347 a distance 596 from reflective layer 571 to allow camera 347 to capture scene images reflecting off the reflective layer 571. HMD viewing structure 540 is coupled to reflective layer 571, in FIG. 5. An imaging field that camera 347 is configured to capture images in may be the same size as the pixel array of display 310. Camera 347 is positioned a distance 596 from reflective layer 571 that is the same or approximately the same as a distance 595 between reflective layer 571 and eyebox area 590. Since camera 347 is positioned approximately the same distance from the middle of reflective layer 571 as eyebox area 590, camera 547 provides a virtual pupil position that is approximately the same as a position of eyebox area 590 with respect to scene light 591, as shown in FIG. 5. Without an obstruction from display 310, eye 202 may have a view 541 of the external world. Camera 347 is configured to capture images of at least a portion of that view 541 by capturing images redirected by reflective layer 571.

Figure 6:
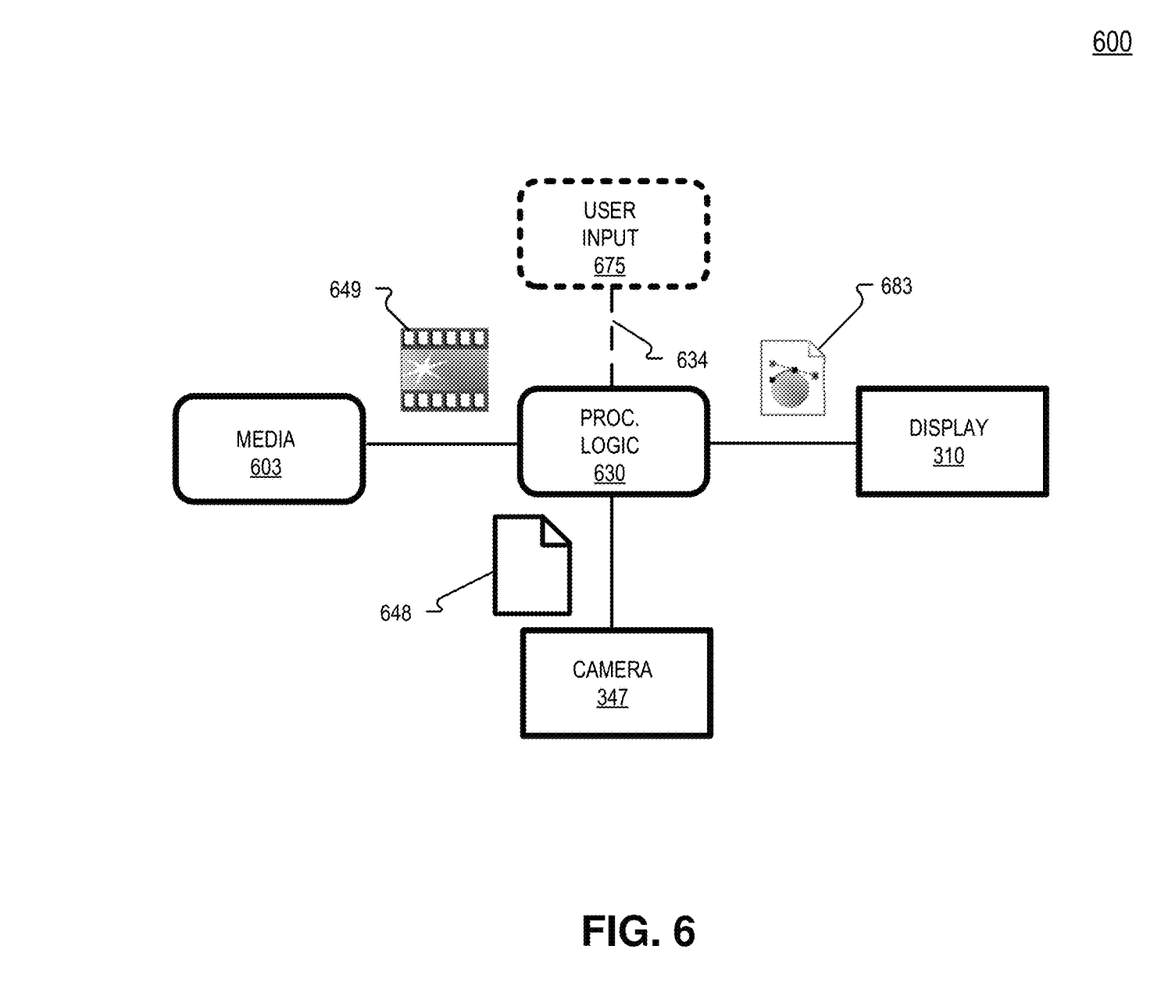
FIG. 6 illustrates an example circuit block diagram of a system that may be incorporated into an HMD, in accordance with embodiments of the disclosure.

FIG. 6 illustrates an example circuit block diagram of a system 600 that may be incorporated into an HMD, in accordance with embodiments of the disclosure. System 600 includes processing logic 630, display 310, camera 347, media 603, and an optional user input 675. Processing logic 630 is configured to drive images onto display 310 for viewing by a user of an HMD. Processing logic 630 is configured to receive scene images 648 from camera 347. The scene images include images of the external environment of the HMD. Processing logic 630 is also configured to receive virtual images 649 from media store 603. Media 603 may be a computer readable storage medium such as a computer memory, a streaming buffer, or otherwise. Processing logic 630 may be configured to generate hybrid images by augmenting virtual images 649 based at least in part on the scene images 648 of the external environment of the HMD captured by the camera 347. For example, if an object in physical space is captured by camera 347, a faint outline of that object (e.g. couch or table) may be incorporated into the virtual images 649 to give an HMD user a sense of her surroundings with a hybrid image or a series of hybrid images that includes the virtual image(s) 649 augmented based at least in part on the scene image(s) 648. Processing logic 630 may then drive the hybrid image(s) 683 onto display 310.

In an embodiment, an HMD includes a user input 675. User input 675 may be a touch interface, a button, a switch, or otherwise. User input 675 is configured to generate an input signal 634 when user input 675 is activated by a user of an HMD. Processing logic 630 is coupled to receive input signal 634 from user input 675. Processing logic 630 may be configured to drive scene images 648 onto display 310 when input signal 634 is received by processing logic 630. In an example context, an HMD user has the HMD secured on his head and his eyes are covered by the HMD. The HMD user is offered a physical object and activates user input 675. Processing logic 630 may then render scene images 648 to display 310 so the user need not remove the HMD to interact with a physical object. Rather, the scene images 648 are presented on display 310. Since the scene images 648 are captured from a virtual pupil position by camera 347 that simulates the user's actual pupil position with respect to scene light, the user may properly interact with the physical object (e.g. grasp the physical object), even if the physical object is in a near-field physical object.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 630) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
a display configured to provide display light to an eyebox area of a user of the HMD;
a first optical layer that is at least partially reflective;
a second optical layer that is at least partially reflective, wherein the first optical layer is disposed between the display and the second optical layer; and
a camera oriented to capture scene images of incoming scene light propagating along a folded optical path that includes propagating through the second optical layer, reflecting off the first optical layer, and reflecting off the second optical layer, the camera disposed in a virtual pupil position of the eyebox area with respect to the incoming scene light.

2. The HMD of claim 1, wherein the first optical layer is spaced a first distance from the second optical layer, and wherein the eyebox area is spaced a second distance from a center of the display, the second distance being approximately three times more than the first distance.

3. The HMD of claim 1, wherein the first optical layer includes a reflective polarizer configured to reflect a first polarization orientation and transmit a second polarization orientation that is orthogonal to the first polarization orientation.

4. The HMD of claim 3 further comprising:
a quarter-waveplate disposed between the first optical layer and the second optical layer; and
a circular polarizer, wherein the second optical layer is disposed between the quarter-waveplate and the circular polarizer.

5. The HMD of claim 4, wherein the second optical layer reflects a first portion of incident visible light and transmits a remaining portion of the visible light.

6. The HMD of claim 1, wherein the first optical layer includes an aperture void, and wherein the camera is positioned to receive the incoming scene light through the aperture void in the first optical layer.

7. The HMD of claim 1, wherein the camera is aligned with an axis running through a middle of the display, and wherein the axis is orthogonal to a pixel plane of the display.

8. The HMD of claim 1 further comprising:
processing logic configured to drive hybrid images onto the display, wherein processing logic is configured to generate the hybrid images by augmenting virtual images based at least in part on the scene images of an external environment of the HMD captured by the camera, the processing logic configured to receive the scene images from the camera.

9. The HMD of claim 1 further comprising:
a user input configured to generate an input signal when activated by a user of the HMD; and
processing logic coupled to receive an input signal from the user input, wherein the processing logic is configured to drive the scene images onto the display when the input signal is received from the user input.

10. The HMD of claim 1, wherein the incoming scene light propagating along the folded optical path propagates through the second optical layer prior to reflecting off the first optical layer.

11. A device comprising:
a display configured to provide display light to an eyebox area;
a first optical layer that is at least partially reflective;
a second optical layer that is at least partially reflective, wherein the first optical layer is disposed between the display and the second optical layer; and
a camera oriented to capture scene images of incoming scene light propagating along a folded optical path that includes reflecting off the first optical layer and reflecting off the second optical layer, the camera disposed in a virtual pupil position of the eyebox area with respect to the incoming scene light, wherein the first optical layer includes a reflective polarizer configured to reflect a first polarization orientation and transmit a second polarization orientation that is orthogonal to the first polarization orientation.

12. A device comprising:
a display configured to provide display light to an eyebox area of a user of the HMD;
a first optical layer that is at least partially reflective;
a second optical layer that is at least partially reflective, wherein the first optical layer is disposed between the display and the second optical layer; and
a camera oriented to capture scene images of incoming scene light propagating along a folded optical path that includes reflecting off the first optical layer and reflecting off the second optical layer, the camera disposed in a virtual pupil position of the eyebox area with respect to the incoming scene light, wherein the camera is aligned with an axis running through a middle of the display, and wherein the axis is orthogonal to a pixel plane of the display.

* * * * *